(12) United States Patent
Maeda et al.

(10) Patent No.: US 8,773,740 B2
(45) Date of Patent: Jul. 8, 2014

(54) IMAGE FORMING APPARATUS WITH PLURALITY OF OPTICAL SCANNING DEVICES

(71) Applicant: Kyocera Document Solutions Inc., Osaka (JP)

(72) Inventors: Ryota Maeda, Osaka (JP); Hiroshi Yamashita, Osaka (JP); Naoki Iwam, Osaka (JP)

(73) Assignee: Kyocera Document Solutions Inc. (JP)

( * ) Notice: Subject to any disclaimer, the term of this patent is extended or adjusted under 35 U.S.C. 154(b) by 11 days.

(21) Appl. No.: 13/772,725

(22) Filed: Feb. 21, 2013

(65) Prior Publication Data
US 2013/0222868 A1    Aug. 29, 2013

(30) Foreign Application Priority Data

Feb. 27, 2012    (JP) .................................. 2012-040064

(51) Int. Cl.
*H04N 1/36*    (2006.01)

(52) U.S. Cl.
USPC ........... 358/504; 358/3.26; 358/1.9; 399/191; 399/223; 399/231

(58) Field of Classification Search
USPC ......................................................... 358/504
See application file for complete search history.

(56) References Cited

FOREIGN PATENT DOCUMENTS

| JP | 2000-214655 | 8/2000 |
|----|-------------|--------|
| JP | 2007-83514  | 4/2007 |

*Primary Examiner* — Barbara Reinier
*Assistant Examiner* — Brendan McCommas
(74) *Attorney, Agent, or Firm* — Gerald E. Hespos; Michael J. Porco; Matthew T. Hespos

(57) ABSTRACT

An image forming apparatus includes a plurality of optical scanning devices, a job receiver, a job executor, an image discriminator for discriminating whether a formation-target image included in an image forming job is a single-color image or a multi-color image, a first condition judger, a second condition judger and a temperature adjuster. In the case of forming a single-color image, the temperature adjuster drives motors of all the optical scanning devices if a predetermined first condition and a predetermined second condition are satisfied and drives the motor of one optical scanning device and does not drive the motors of the other optical scanning devices but the one optical scanning device if the first condition is satisfied, but the second condition is not satisfied.

8 Claims, 7 Drawing Sheets

IMAGE FORMING APPARATUS WITH PLURALITY OF OPTICAL SCANNING DEVICES

INCORPORATION BY REFERENCE

This application is based on Japanese Patent Application Serial No. 2012-40064 filed with the Japan Patent Office on Feb. 27, 2012, the contents of which are hereby incorporated by reference.

BACKGROUND

The present disclosure relates to an image forming apparatus with a plurality of optical scanning devices and particularly to a technology for suppressing a scan position shift which occurs due to a temperature difference between optical scanning devices.

Conventionally, an image forming apparatus has been known which includes an image forming unit configured to form a toner image on a surface of a photoconductive drum and provided for each of a plurality of colors. The respective image forming units are arranged along a conveying direction of a recording sheet above a conveyor belt for conveying the recording sheet and transfer toner images of the respective colors to the recording sheet conveyed in the conveying direction in a superimposing manner.

In the image forming apparatus of this type, each image forming unit deflects laser light output from a light source by a scanning lens made using optical resin with good optical properties after reflecting the laser light by a rotational polygon mirror which is driven and rotated, whereby the laser light is scanned across the surface of the photoconductive drum at a constant speed. In this way, an electrostatic latent image is formed on the photoconductive drum surface.

Here, toner images of the respective colors formed on the photoconductive drums by attaching toners to electrostatic latent images need to be transferred in a superimposing manner so as not to cause any position shift on a recording sheet. To this end, a control is executed to adjust write positions (scan positions) of the electrostatic latent images on the surfaces of the photoconductive drums. For example, a control is executed to adjust the operations of the other rotational polygon mirrors so that the rotational polygon mirror in a certain image forming unit and those in the other image forming units rotate with predetermined phase differences.

However, if the temperatures of the respective image forming units differ due to usage frequencies and arranged positions of the respective image forming units, refractive indices of the optical resins forming the scanning lenses may change to be different from each other according to temperature. This may shift laser light paths among the respective image forming units. Even in the case of executing the above control, laser light scan positions may shift among the respective image forming units.

One conventional technology is known which suppresses laser light scan position shifts occurring due to such temperature differences among respective image forming units. According to this conventional technology, when image recording is performed by operating one of a plurality of image forming units, heating means of optical scanning devices in the other image forming units are also operated so that temperature differences of the optical scanning devices in the respective image forming units fall within a predetermined range.

Further, according to another conventional technology, an image of a specific color is formed by rotating a rotational polygon mirror necessary to form the image of the specific color at a rated rotating speed and other rotational polygon mirrors at a rotating speed lower than the rated rotating speed. This enables reductions in noise, vibration, smear of the optical scanning devices and the like while suppressing scan position shifts at the time of image formation.

However, if single-color image formation using one optical scanning device is frequently performed, image formation using a plurality of optical scanning devices is less frequently performed. Thus, scan position shifts due to temperature differences among the respective optical scanning devices are less likely to occur. If scan position shifts occurring due to the temperature differences among the respective optical scanning devices are suppressed by applying the above conventional technology to drive heaters of the unused other optical scanning devices during single-color image formation even in such a case, power is unnecessarily consumed, which is not preferable in terms of energy saving.

An object of the present disclosure is to suppress scan position shifts which occur due to temperature differences among respective optical scanning devices without unnecessarily consuming power.

SUMMARY

An image forming apparatus according to one aspect of the present disclosure includes a plurality of photoconductors, a plurality of optical scanning devices, a job receiver, a job executor, an image discriminator, a first condition judger, a second condition judger and a temperature adjuster.

The optical scanning devices are arranged in correspondence with the plurality of photoconductors, scan the corresponding photoconductors with laser light and each include a light source for emitting laser light, a rotational polygon mirror for reflecting the laser light output from the light source to scan the photoconductor, a motor for rotating the rotational polygon mirror, and a temperature detector for detecting temperature of the optical scanning device. The job receiver receives an execution request of an image forming job. The job executor executes the image forming job, the execution request of which has been received by the job receiver. The image discriminator discriminates whether each formation-target image included in the image forming job being executed is a single-color image to be formed using only one of the plurality of optical scanning devices or a multi-color image to be formed using a plurality of ones of the optical scanning devices. The first condition judger judges whether or not a largest temperature difference out of temperature differences between temperature detected by the temperature detector of the one optical scanning device and temperatures detected by all the temperature detectors but the temperature detector of the one optical scanning device satisfies a first condition of being larger than a predetermined temperature difference. The second condition judger judges whether or not a second condition indicating a high possibility that a next formation-target image is the multi-color image is satisfied. The temperature adjuster performs a total motor drive process for driving the motors of all the optical scanning devices if the first condition is judged to be satisfied by the first condition judger and the second condition is judged to be satisfied by the second condition judger when a current formation-target image is discriminated to be the single-color image by the image discriminator and drives the motor of the one optical scanning device and does not drive the motors of all the optical scanning devices but the one optical scanning device if the first condition is judged to be satisfied by the first condition judger and the second condition is judged not to be satisfied by the second condition judger when a current formation-target image is discriminated to be the single-color image by the image discriminator.

These and other objects, features and advantages of the present disclosure will become more apparent upon reading the following detailed description along with the accompanying drawings.

DETAILED DESCRIPTION

Figure 1:
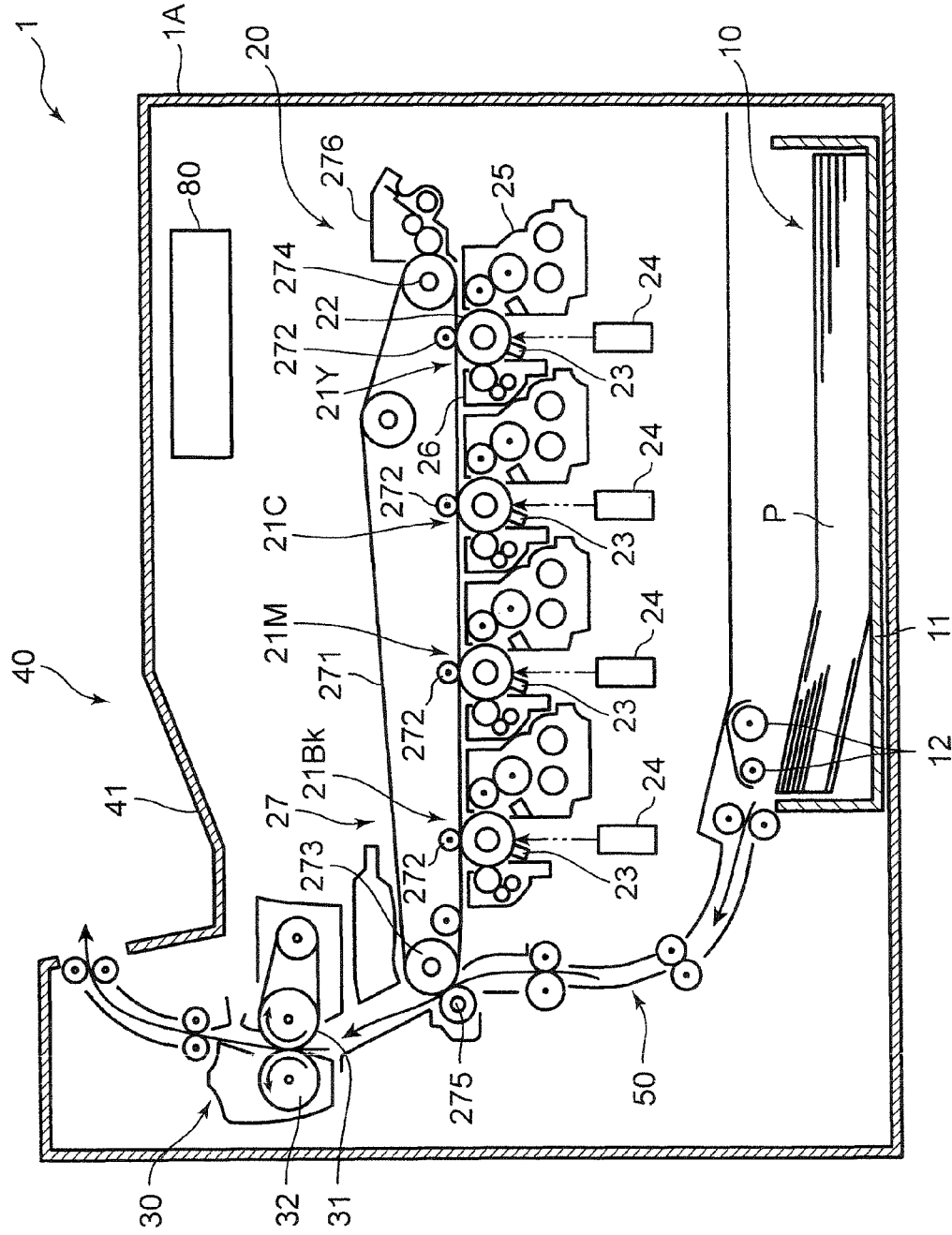
FIG. 1 is a schematic configuration diagram of a tandem color printer according to one embodiment of an image forming apparatus of the present disclosure.

Hereinafter, an embodiment according to the present disclosure is described based on the drawings. FIG. 1 is a schematic configuration diagram of a tandem color printer 1 according to one embodiment of an image forming apparatus of the present disclosure.

As shown in FIG. 1, the color printer 1 includes a sheet storage unit 10, an image forming station 20, a fixing unit 30, a sheet discharge unit 40, a sheet conveyance path 50 and a control unit 80. Each unit excluding the sheet discharge unit 40 is housed in a substantially box-shaped apparatus main body 1A. The sheet discharge unit 40 is provided on top of the apparatus main body 1A.

The sheet storage unit 10 stores sheets P and picks up a sheet P and feeds it by the control of the control unit 80. The sheet storage unit 10 includes a sheet cassette 11 which is insertable into and withdrawable from the apparatus main body 1A. Pickup rollers 12 for picking up sheets P one by one from a sheet stack are provided on an upstream end of the sheet cassette 11 (left upper side of the sheet cassette 11 in an example shown in FIG. 1). The sheet P picked up from the sheet cassette 11 by driving these pickup rollers 12 is fed to the sheet conveyance path 50.

The image forming station 20 applies an image transfer process to a sheet P under the control of the control unit 80. This transfer process is performed on each sheet P picked up from the sheet stack stored in the sheet storage unit 10 based on an image signal received by an unillustrated interface circuit from a computer or the like. The interface circuit is connected to an external apparatus such as a computer via a LAN (Local Area Network) or the like and transmits and receives various signals to and from the external apparatus. For example, a network interface (10/100Base-TX) or the like is used as the interface circuit.

The image forming station 20 includes image forming units 21Y, 21C, 21M and 21Bk of respective colors for forming toner images, and a transfer device 27 for transferring toner images formed by these image forming units 21Y, 21C, 21M and 21Bk to a sheet P.

The four image forming units 21Y, 21C, 21M and 21Bk are arranged substantially in a horizontal direction from an upstream side (right side in FIG. 1) to a downstream side. The yellow image forming unit 21Y is arranged on the most upstream side and the cyan image forming unit 21C, the magenta image forming unit 21M and the black image forming unit 21Bk are arranged in this order thereafter. The respective image forming units 21Y, 21C, 21M and 21Bk have a similar configuration and are mounted in the apparatus main body 1A while being positioned to have a predetermined relative positional relationship with the respective devices in the apparatus main body 1A.

Each of the image forming units 21Y, 21C, 21M and 21Bk includes a photoconductive drum (photoconductor) 22, a charger 23, an optical scanning device 24, a developing device 25 and a cleaning device 26. The photoconductive drum 22 is rotatable about a drum shaft extending in forward and backward directions (directions orthogonal to the plane of FIG. 1). The charger 23, the optical scanning device 24, the developing device 25 and the cleaning device 26 are arranged in this order from a position right below the photoconductive drum 22 in a counterclockwise direction, which is a rotating direction of the photoconductive drum 22, along the circumferential surface of the photoconductive drum 22.

The photoconductive drum 22 has the circumferential surface on which an electrostatic latent image and a toner image in conformity with this electrostatic latent image are to be formed.

The charger 23 uniformly charges the circumferential surface of the photoconductive drum 22 rotating counterclockwise about the drum shaft with electric charges. The charger 23 includes a charging roller for applying electric charges to the photoconductive drum 22 while being rotated by having the circumferential surface thereof held in contact with the circumferential surface of the photoconductive drum 22.

The developing device 25 supplies toner to the circumferential surface of the photoconductive drum 22. The toner is attached to an electrostatic latent image on the circumferential surface of the photoconductive drum 22 by the toner supply, whereby a toner image is formed on the circumferential surface of the photoconductive drum 22. Note that yellow (Y) toner is contained in the developing device 25 of the yellow image forming unit 21Y, cyan (C) toner is contained in the developing device 25 of the cyan image forming unit 21C, magenta (M) toner is contained in the developing device 25 of the magenta image forming unit 21M and black (Bk) toner is contained in the developing device 25 of the black image forming unit 21Bk.

The cleaning device 26 performs cleaning by removing the toner remaining on the circumferential surface of the photoconductive drum 22 after primary transfer to be described later. The circumferential surface of the photoconductive drum 22 cleaned by this cleaning device 26 heads for the charger 23 again for the next image forming process.

The optical scanning device 24 irradiates the circumferential surface of the photoconductive drum 22 while being rotated with laser light modulated based on image data. An irradiation position of the laser light is between the charger 23 and the developing device 25. An electrostatic latent image is formed on the circumferential surface of the photoconductive drum 22 by the irradiation of the laser light. The respective optical scanning devices 24 (a plurality of optical scanning devices) in the respective image forming units 21Y, 21C, 21M and 21Bk irradiate laser light of the respective colors of yellow, cyan, magenta and black to the photoconductive drums 22 of the respective image forming units 21Y, 21C, 21M and 21Bk. When the laser light is irradiated to the uniformly charged circumferential surface of the photoconductive drum 22, electric charges in that irradiated part are erased according to the intensity of the laser light. In this way, the electrostatic latent image is formed on the circumferential surface of the photoconductive drum 22. Note that the image data are, for example, yellow, cyan, magenta and black image data received by the unillustrated interface circuit. These image data are image data generated by applying known processings such as a color correction processing to image signals input from the external apparatus such as a computer.

The transfer device 27 is a device for transferring the toner images formed on the circumferential surfaces of the photoconductive drums 22 to a sheet P. The transfer device 27 includes an intermediate transfer belt 271, primary transfer rollers 272, a drive roller 273, a driven roller 274 and a secondary transfer roller 275.

The intermediate transfer belt 271 is an endless belt and mounted right above the respective image forming units 21Y, 21C, 21M and 21Bk by a plurality of primary transfer rollers 272, the drive roller 273 and the driven roller 274. The intermediate transfer belt 271 is rotatable clockwise by a rotational drive force of the drive roller 273.

The respective primary transfer rollers 272 are arranged to face the respective photoconductive drums 22 of the respective image forming units 21Y, 21C, 21M and 21Bk. The lift of the intermediate transfer belt 271 from the photoconductive drums 22 is prevented by the respective primary transfer rollers 272 pressing the intermediate transfer belt 271. A primary transfer bias is applied to each primary transfer roller 272. When the primary transfer bias is applied to the primary transfer roller 272, the toner image formed on the circumferential surface of the photoconductive drum 22 is primarily transferred to the intermediate transfer belt 271.

The secondary transfer roller 275 is arranged at a position to face the drive roller 273 on the outer circumferential surface of the intermediate transfer belt 271. A secondary transfer bias is applied to the secondary transfer roller 275. When the secondary transfer bias is applied to the secondary transfer roller 275, the toner images primarily transferred to the intermediate transfer belt 271 are secondarily transferred to a sheet P.

A cleaning device 276 for the intermediate transfer belt is provided at the right side of the driven roller 274 in FIG. 1. The toner remaining on the surface of the intermediate transfer belt 271 after the secondarily transfer of the toner images to the sheet P is removed by this cleaning device 276 for the intermediate transfer belt. The surface of the intermediate transfer belt 271 cleaned in this way heads for the photoconductive drums 22.

The fixing unit 30 applies a fixing process by heating to the sheet P carrying the secondarily transferred toner images under the control of the control unit 80. The fixing unit 30 includes a heat roller 31 in which an electric heating element is mounted and a pressure roller 32 arranged such that the circumferential surface thereof faces that of this heat roller 31. The sheet P after the secondary transfer passes a nip portion between the heat roller 31 that is driven and rotated clockwise about a roller shaft and the pressure roller 32 that rotates counterclockwise about a roller shaft following the rotation of the heat roller 31, whereby the fixing process is applied by obtaining heat from the heat roller 31. The sheet P to which the fixing process was applied is discharged to the sheet discharge unit 40 along the sheet conveyance path 50.

The sheet P to which the fixing process was applied in the fixing unit 30 is discharged to the sheet discharge unit 40, which stores this discharged sheet P. The sheet discharge unit 40 is formed by recessing a top part of the apparatus main body 1A. A sheet discharge tray 41 for receiving discharged sheets P is formed at the bottom of a recess.

The sheet conveyance path 50 conveys a sheet P fed from the sheet storage unit 10 to the sheet discharge unit 40 via the image forming station 20 and the fixing unit 30 under the control of the control unit 80.

The control unit 80 is connected to the sheet storage unit 10, the image forming station 20, the fixing unit 30, the sheet conveyance path 50 and the like and controls the operations of these units. The control unit 80 is, for example, configured by a microcomputer including a CPU (Central Processing Unit), a ROM (Read Only Memory) storing various programs to be executed by the CPU, data necessary for the execution of these programs and the like, a RAM (Random Access Memory) which is a so-called working memory of the CPU, peripheral circuits of the CPU and the like.

An image forming operation in the thus configured color printer 1 is described. First, after the circumferential surface of the photoconductive drum 22 is uniformly charged by the charger 23, the circumferential surface is exposed to light by the optical scanning device 24. In this way, an electrostatic latent image is formed on the circumferential surface of the photoconductive drum 22. This electrostatic latent image is developed with the toner supplied by the developing device 25. The toner image formed on the surface of the photoconductive drum 22 is transferred onto the intermediate transfer belt 271 by a transfer bias applied to the primary transfer roller 272. The residual toner remaining on the photoconductive drum 22 without being transferred to the intermediate transfer belt 271 is cleaned by the cleaning device and collected into an unillustrated collection bottle. Such exposing, developing and primary transfer operations are successively performed for each of development colors of yellow, cyan, magenta and black. Toner images of the respective colors are superimposed on the surface of the intermediate transfer belt 271 to form a full-color toner image on the intermediate transfer belt 271.

The full-color toner image primarily transferred to the intermediate transfer belt 271 is secondarily transferred to a sheet P timely conveyed from the sheet storage unit 10 to a transfer position along the sheet conveyance path 50 in a secondary transfer portion where the secondary transfer roller 275 and the intermediate transfer belt 271 are in contact. During this secondary transfer, a secondary transfer bias is applied to the secondary transfer roller 275. The full-color toner image transferred to the sheet P is fixed to the sheet P by heating and pressing by the fixing unit 30. Thereafter, this sheet P is discharged to the sheet discharge unit 40. Note that the toner remaining on the intermediate transfer belt 271 is collected by the cleaning device 276 for the intermediate transfer belt for cleaning the surface of the intermediate transfer belt 271 and collected into the unillustrated collection bottle.

Figure 2:
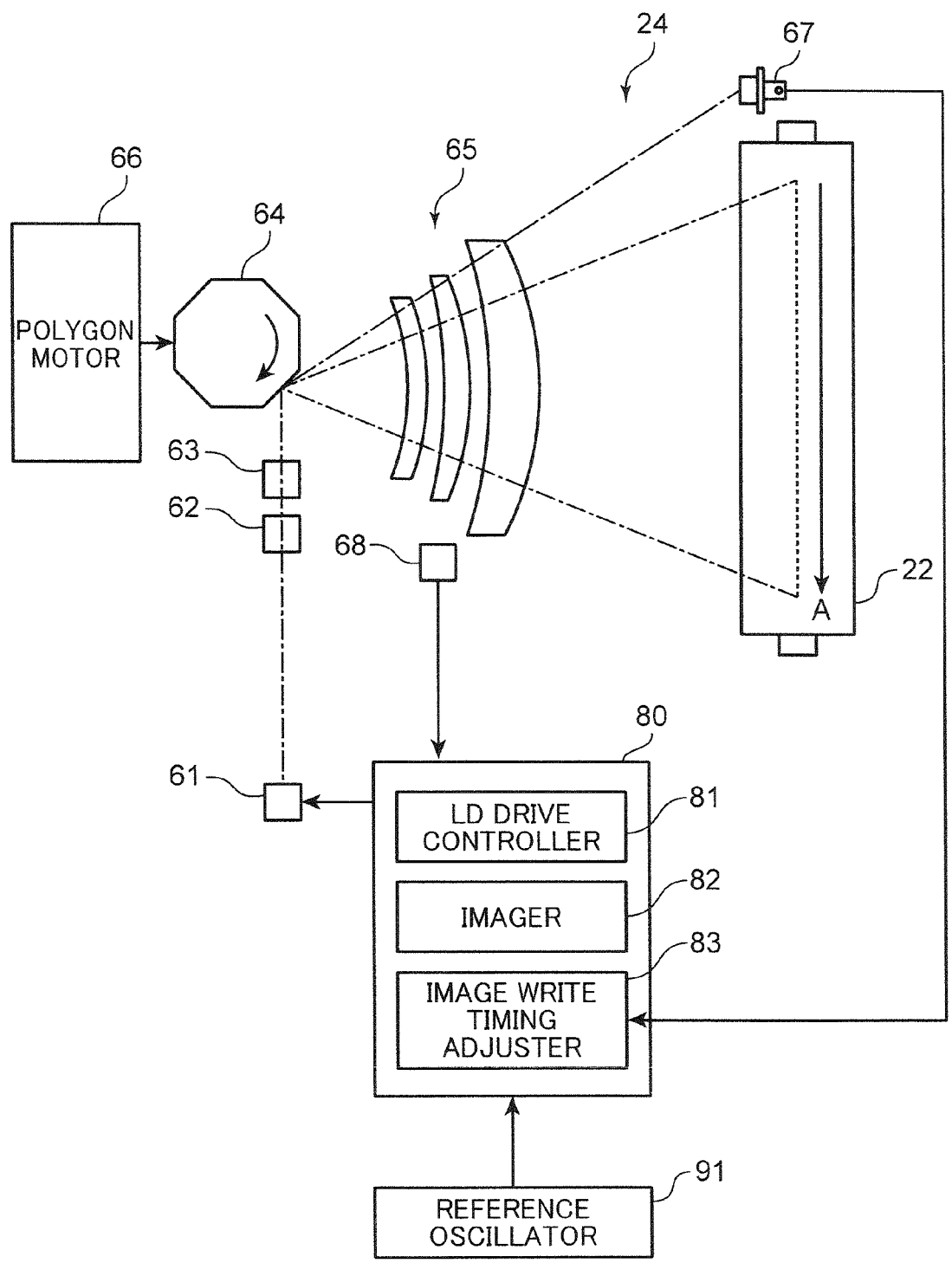
FIG. 2 is a schematic configuration diagram showing the internal configuration of an optical scanning device according to the embodiment.

FIG. 2 is a schematic configuration diagram showing an example of the internal configuration of the optical scanning device 24. Note that since the configurations of the optical scanning devices 24 in the respective image forming units 21Y, 21C, 21M and 21Bk are similar, the following description is made, taking the image forming unit 21Bk as an example.

The optical scanning device 24 includes a laser emitter (light source) 61, a collimator lens 62, a prism 63, a polygon mirror (rotational polygon mirror) 64, an fθ lens 65, a polygon motor (motor) 66, a beam detect sensor (hereinafter, BD (Beam Detect) sensor) 67, and a temperature sensor (temperature detector) 68. Note that the control unit 80 is electrically connected to each optical scanning device 24.

The laser emitter 61 includes a laser light source such as a laser diode (LD) for emitting laser light. Laser light output from the laser light source is converted into parallel light by the collimator lens 62, the prism 63 and the like. This parallel light is reflected toward the polygon mirror 64 by an unillustrated reflecting mirror and incident on the polygon mirror 64 rotated by driving the polygon motor 66.

The polygon mirror 64 includes a plurality of reflecting surfaces for reflecting the laser light output from the laser emitter 61 toward the photoconductive drum 22 and scanning the circumferential surface of the photoconductive drum 22 with this laser light (for example, there are eight reflecting surfaces in FIG. 2). The polygon mirror 64 is driven and rotated, for example, in an arrow direction of FIG. 2 at a constant speed by the polygon motor 66, whereby the laser light emitted from the laser emitter 61 is reflected by the respective reflecting surfaces of the polygon mirror 64.

The fθ lens 65 (optical lens made of resin) is formed by, for example, mold-forming optical resin with good optical properties. The fθ lens 65 condenses the laser light reflected by the polygon mirror 64 and focuses it on the circumferential surface of the photoconductive drum 22. By this laser light, the circumferential surface of the photoconductive drum 22 is scanned at a constant speed in a rotary axis direction (main scanning direction, direction of arrow A of FIG. 2) to erase electric charges on the circumferential surface of the photoconductive drum 22. In this way, an electrostatic latent image is formed on the circumferential surface of the photoconductive drum 22.

The BD sensor 67 includes, for example, a photodiode and used to adjust a timing at which beam scanning (hereinafter, referred to as an image writing operation) for forming a toner image (electrostatic latent image) is performed on the photoconductive drum 22. When the laser light reflected by the polygon mirror 64 rotating in the arrow direction shown in FIG. 2 is incident on the BD sensor 67 through the fθ lens 65, a detection signal is output from the BD sensor 67. The detection signal of the BD sensor 67 is input to an image write timing adjuster 83 to be described later and used to adjust an image write timing of the laser light for scanning the circumferential surface of the photoconductive drum 22.

The temperature sensor 68 detects the temperature of the corresponding optical scanning device 24. Specifically, the temperature sensor 68 is arranged outside a laser light path and within a predetermined short distance from the fθ lens 65 in a housing forming an outer body of the optical scanning device 24. The temperature sensor 68 detects temperature near the fθ lens 65 and outputs a detection signal indicating this detected temperature to the control unit 80.

A refractive index of the fθ lens 65 is changed by temperature near the vicinity of the fθ lens 65. Thus, if there are differences between temperatures near the fθ lenses 65 among the respective optical scanning devices 24, refractive indices of the fθ lenses 65 are made different among the respective optical scanning devices 24 by this. Thus, a moving speed of the laser light in the main scanning direction (main scanning magnification) may change among the respective optical scanning devices 24. Therefore, as described later, the respective optical scanning devices 24 are temperature-controlled by the control unit 80 to reduce differences between the temperatures near the fθ lenses 65 among the respective optical scanning devices 24. The detection signal of the temperature sensor 68 is used for the temperature control of each optical scanning device 24.

The color printer 1 includes a reference oscillator 91 for generating a reference clock signal. The control unit 80 obtains an operation timing by the reference clock signal output from the reference oscillator 91. The control unit 80 adjusts an image write timing in accordance with the operation timing in controlling the drive of the laser emitter 61 based on image data of an image to be written.

The control unit 80 functions particularly as an LD drive controller 81, an imager 82 and the image write timing adjuster 83 to control laser light scanning by the optical scanning device 24.

The LD drive controller 81 controls the drive of the laser emitter 61 based on an instruction from the imager 82. The imager 82 starts the drive of the LD drive controller 81 based on image data of an image to be written. The image write timing adjuster 83 adjusts an image write timing, at which the laser light is scanned across the surface of the photoconductive drum 22, based on a BD signal output from the BD sensor 67 and outputs it to the imager 82.

Figure 3:
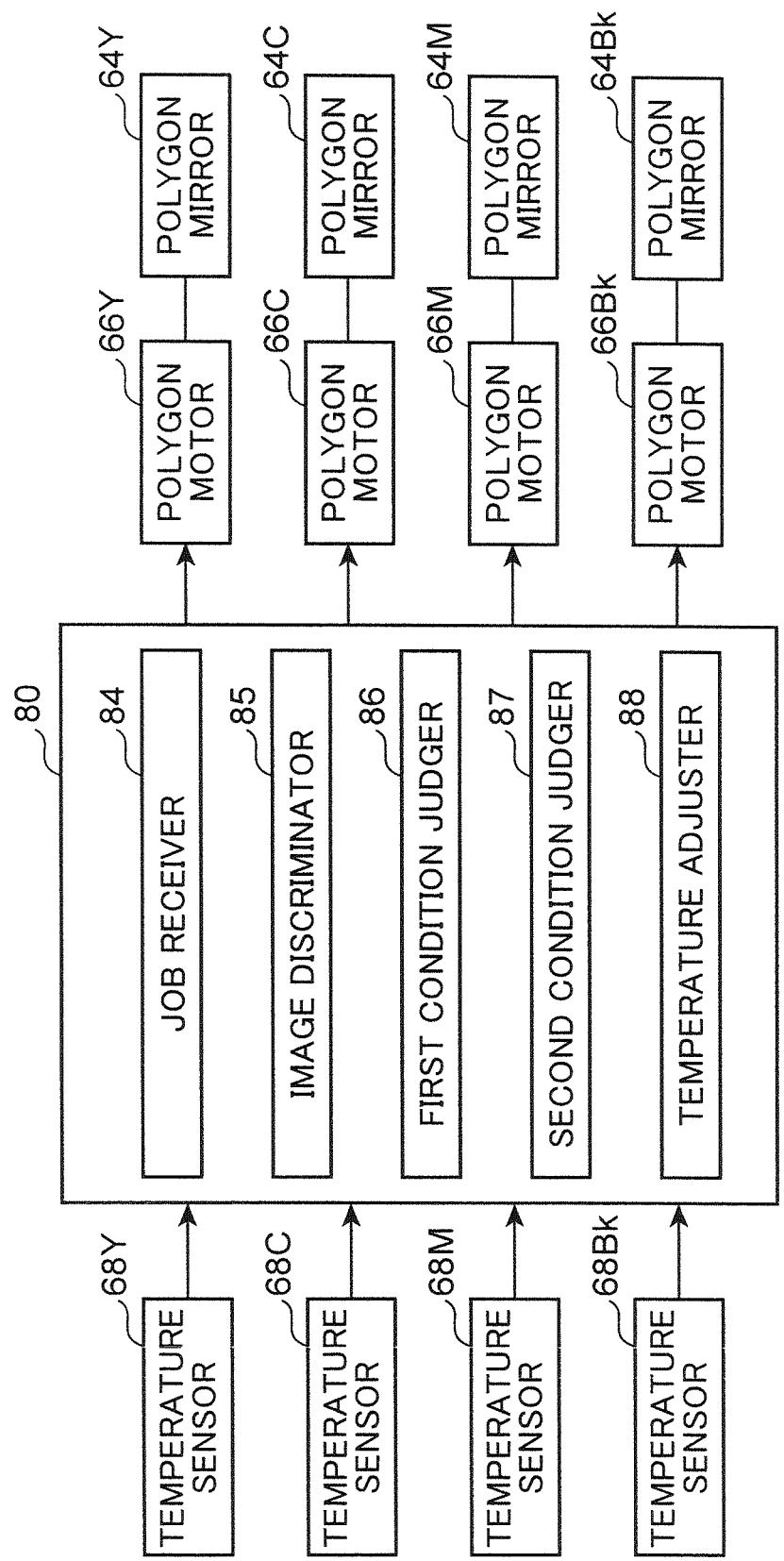
FIG. 3 is a block diagram showing a configuration relating to a temperature control system for the optical scanning devices.

FIG. 3 is a block diagram showing a configuration relating to a temperature control system for the optical scanning devices 24. Note that, in the following description, the polygon mirrors 64 of the optical scanning devices 24 of the respective colors of yellow Y, cyan C, magenta M and black Bk are respectively denoted by "64Y", "64C", "64M" and "64Bk". Further, the polygon motors 66 of the optical scanning devices 24 of the respective colors of yellow Y, cyan C, magenta M and black Bk are respectively denoted by "66Y", "66C", "66M" and "66Bk". Furthermore, the temperature sensors 68 of the optical scanning devices 24 of the respective colors of yellow Y, cyan C, magenta M and black Bk are respectively denoted by "68Y", "68C", "68M" and "68Bk".

The control unit 80 functions to particularly include a job receiver 84, an image discriminator 85, a first condition judger 86, a second condition judger 87 and a temperature adjuster in association with the temperature control of the optical scanning devices 24 of the respective colors of yellow Y, cyan C, magenta M and black Bk.

The job receiver 84 receives an execution request of an image forming job. For example, the job receiver 84 receives an execution request of an image forming job by receiving a signal indicating the execution request of the image forming job via the interface circuit from an external apparatus such as a computer. The signal indicating the execution request of the image forming job includes image data, a signal for requesting image formation using the image data, and the like.

The image forming job is configured to include image data indicating formation-target images and information indicating image forming conditions. The information indicating the image forming conditions includes, for example, information indicating an instruction as to whether the formation-target image is to be formed as a monochrome image (single-color image) or as a color image (multicolor image), information indicating the number of sets of copies to be made at the time of image formation, and the like. Here, a monochrome image is an image formed using any one of the plurality of optical scanning devices 24. A color image is an image using a plurality of optical scanning devices 24.

Note that information indicating an instruction to form a monochrome image includes information indicating the use of the optical scanning device 24 of which one of yellow Y, cyan C, magenta M and black Bk to form this monochrome image. Information indicating an instruction to form a color image includes information indicating the use of the optical scanning devices 24 of which ones of yellow Y, cyan C, magenta M and black Bk to form this color image.

Without being limited to this, the job receiver 84 may be configured to receive an execution request of an image forming job by the operation of a user performed on an unillustrated operation input device such as a touch panel. Specifically, the job receiver 84 receives image data input via an unillustrated external interface circuit or stored in an external storage medium such as a USB (Universal Serial Bus) memory. Further, the job receiver 84 receives information indicating image forming conditions input by the operation of the operation input device. The information indicating the image forming conditions includes information indicating an instruction as to whether the formation-target image indicated by the received image data is to be formed as a monochrome image or as a color image, information indicating the number of sets of copies to be made at the time of image formation, and the like.

The image discriminator 85 discriminates whether each formation-target image included in an image forming job being executed is a monochrome image or a color image based on information included in the image forming job and indicating image forming conditions.

The first condition judger 86 judges whether or not a largest temperature difference out of temperature differences between temperature detected by the temperature sensor 68 of the optical scanning device 24 of any one color used for image formation of a monochrome image out of yellow Y, cyan C, magenta M and black Bk and temperatures detected by the temperature sensors 68 of the optical scanning devices 24 of all the colors but the one satisfies a first condition of being larger than a predetermined temperature difference when the formation-target image is discriminated to a monochrome image by the image discriminator 85.

For example, if the optical scanning device 24 used for monochrome image formation is of black Bk, the first condition judger 86 compares temperature detected by the temperature sensor 68Bk and those detected by the temperature sensors 68Y, 68C and 68M of yellow Y, cyan C and magenta M and specifies the largest temperature difference. For example, if the temperature difference from the temperature detected by the temperature sensor 68M of magenta M is largest, the first condition judger 86 judges whether or not the temperature difference between the detected temperature by the temperature sensor 68Bk and that by the temperature sensor 68M satisfies the first condition. Note that the predetermined temperature difference is determined in advance based on an experimental value such as one obtained in trial operation, and stored in the ROM.

The second condition judger 87 judges whether or not a second condition indicating a high possibility that a next formation-target image is a color image is satisfied.

The temperature adjuster 88 performs a total motor drive process if the first condition is judged to be satisfied by the first condition judger 86 and the second condition is judged to be satisfied by the second condition judger 87 when a current formation-target image is discriminated to be a monochrome image by the image discriminator 85. This total motor drive process is a drive process for driving not only the polygon motor 66 of one optical scanning device 24 for image formation, but also the polygon motors 66 of the optical scanning devices 24 of all the other colors but the one optical scanning device 24.

On the other hand, the temperature adjuster 88 drives only the polygon motor 66 of the optical scanning device 24 for image formation if the first condition is judged to be satisfied by the first condition judger 86, but the second condition is judged not to be satisfied by the second condition judger 87 when a current formation-target image is discriminated to be a monochrome image by the image discriminator 85. Specifically, the temperature adjuster 88 drives the polygon motor 66 of the one optical scanning device 24 for image formation, but does not drive the polygon motors 66 of the optical scanning devices 24 of all the other colors but the one optical scanning device 24 under the above condition.

Further, the temperature adjuster 88 stops the polygon motors 66 of the optical scanning devices 24 of all the other colors but the one optical scanning device 24 when the largest temperature difference out of temperature differences between the temperature detected by the temperature sensor 68 of the one optical scanning device 24 used for image formation and the temperatures detected by the temperature sensors 68 of the optical scanning devices 24 of all the other colors but the one optical scanning device 24 becomes smaller than a second temperature difference smaller than the predetermined temperature difference while the total motor drive process is performed, thus the polygon motors 66 of the all the optical scanning devices 24 are driven.

For example, if the optical scanning device 24 used for image formation is of black Bk, the temperature adjuster 88 compares the temperature detected by the temperature sensor 68Bk and those detected by the temperature sensors 68Y, 68C and 68M of yellow Y, cyan C and magenta M and specifies the largest temperature difference during the execution of the total motor drive process. For example, if the temperature difference from the temperature detected by the temperature sensor 68Y of yellow Y is largest, the temperature adjuster 88 judges whether or not the temperature difference between the detected temperature by the temperature sensor 68Bk and that by the temperature sensor 68Y is smaller than the second temperature difference. If this temperature difference is smaller than the second temperature difference, the temperature adjuster 88 stops the polygon motors 66Y, 66C and 66M. Note that the second temperature difference is determined to be smaller than the predetermined temperature difference based on an experimental value such as one obtained in trial operation, and stored in the ROM.

Figure 4:
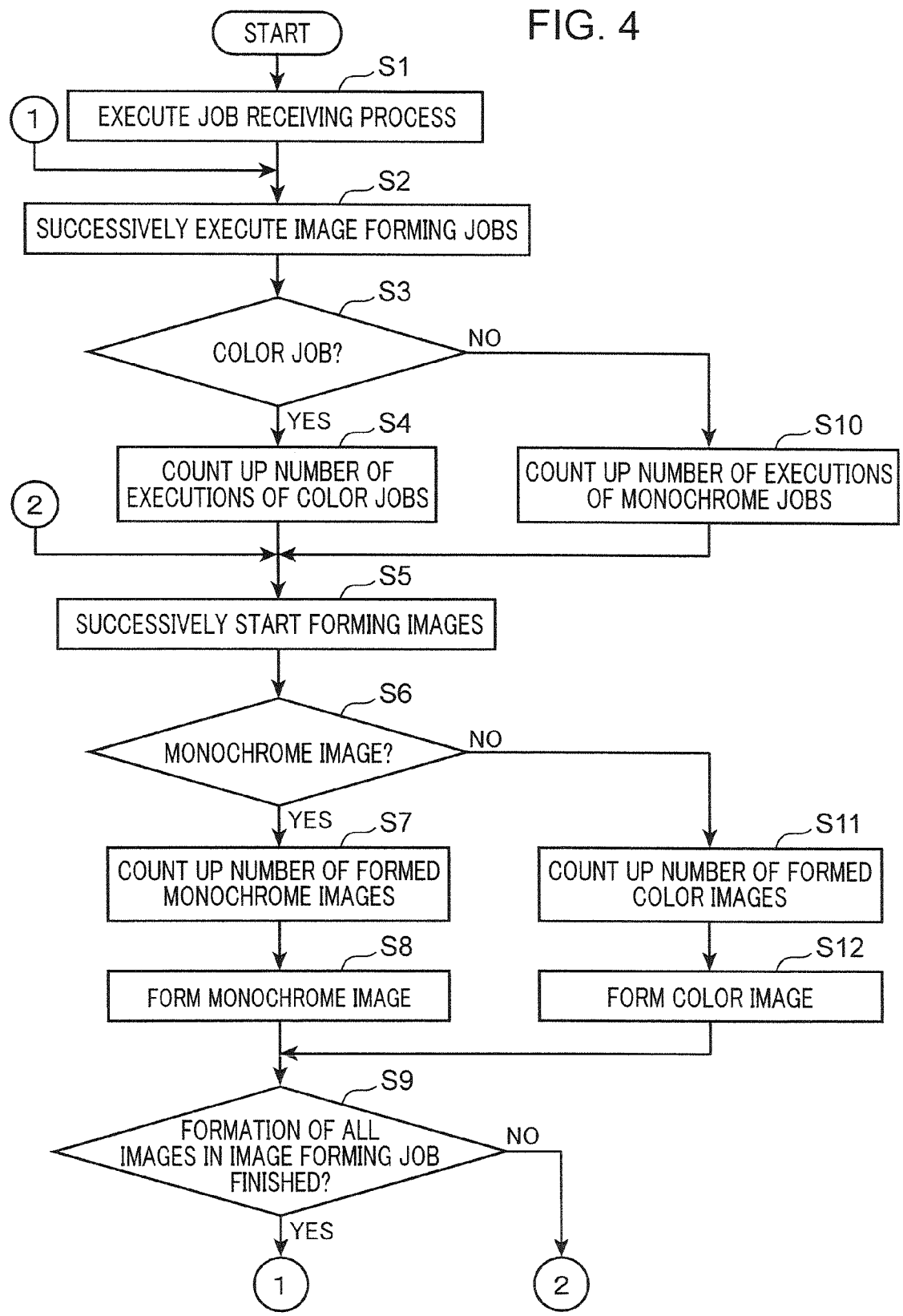
FIG. 4 is a flow chart showing an execution control operation of an image forming job.
Figure 5:
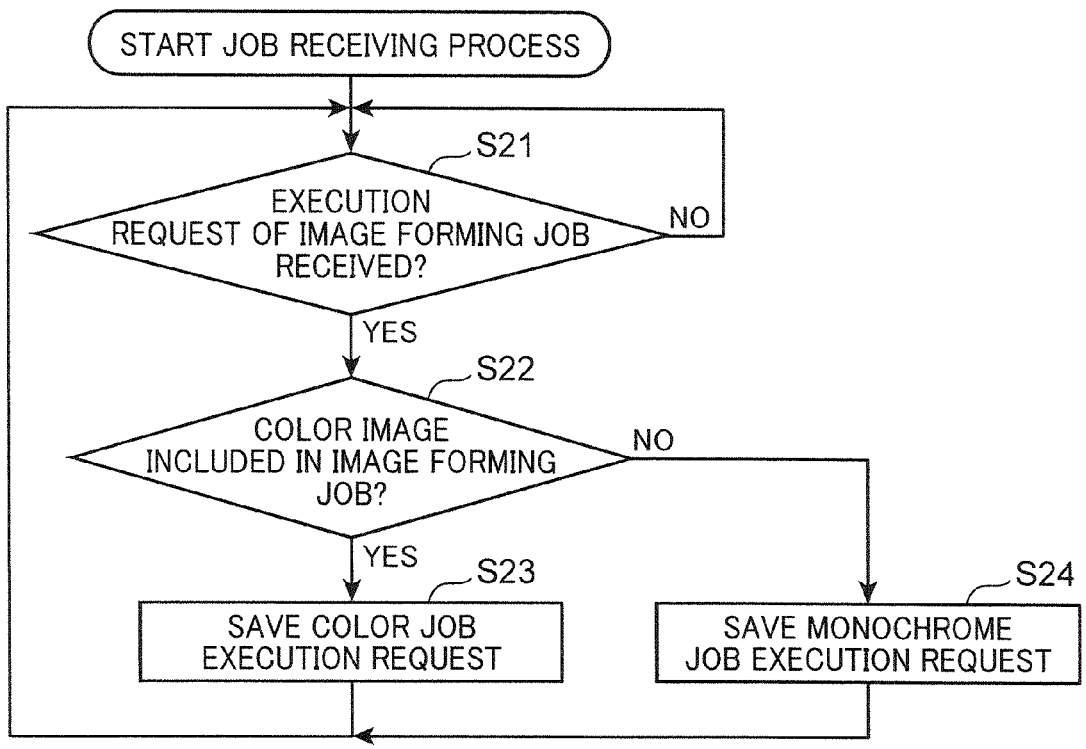
FIG. 5 is a flow chart showing the operation of a process of receiving an execution request of the image forming job.
Figure 6:
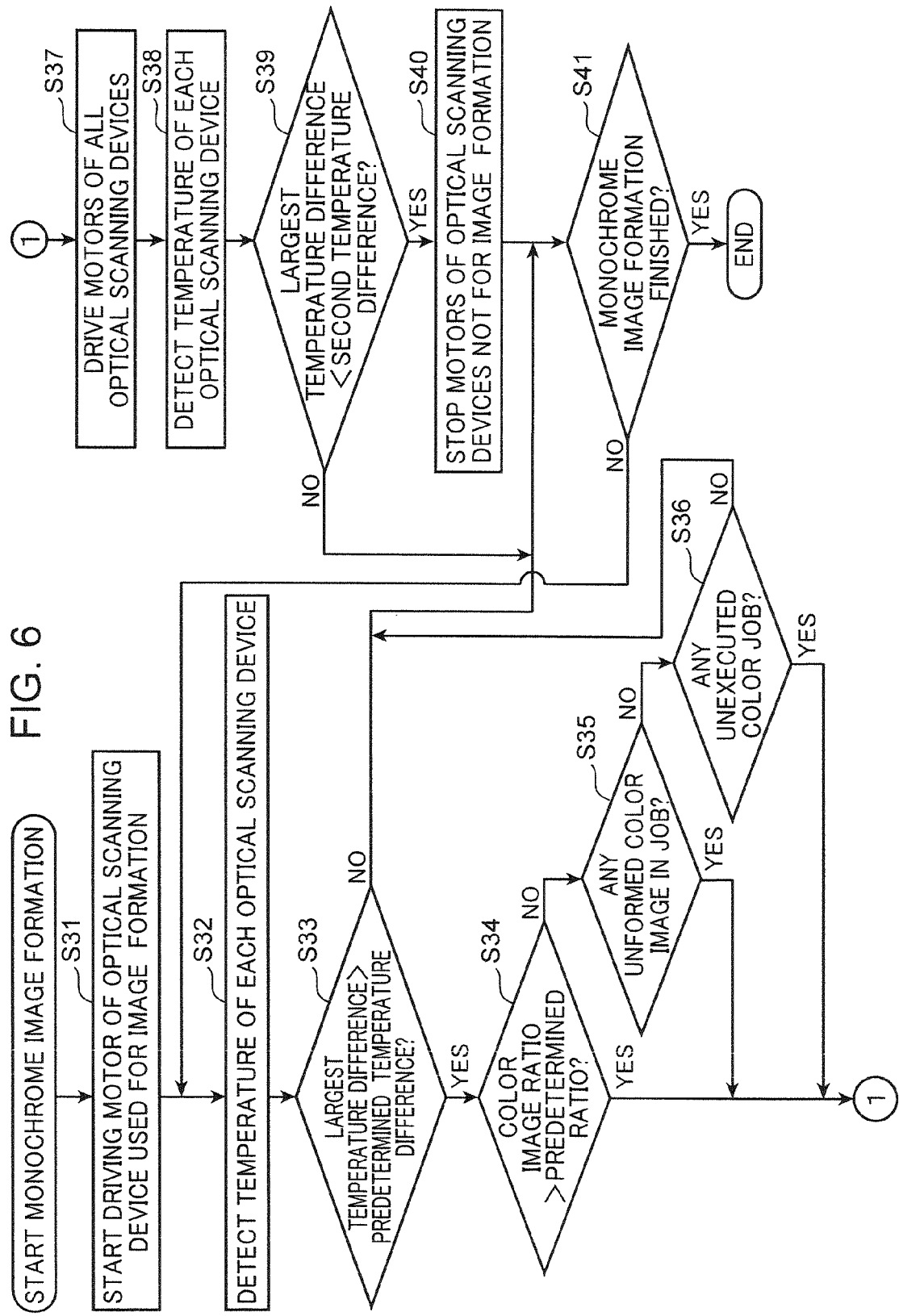
FIG. 6 is a flow chart showing the operation of a temperature control for the respective optical scanning devices during single-color image formation.
Figure 7:
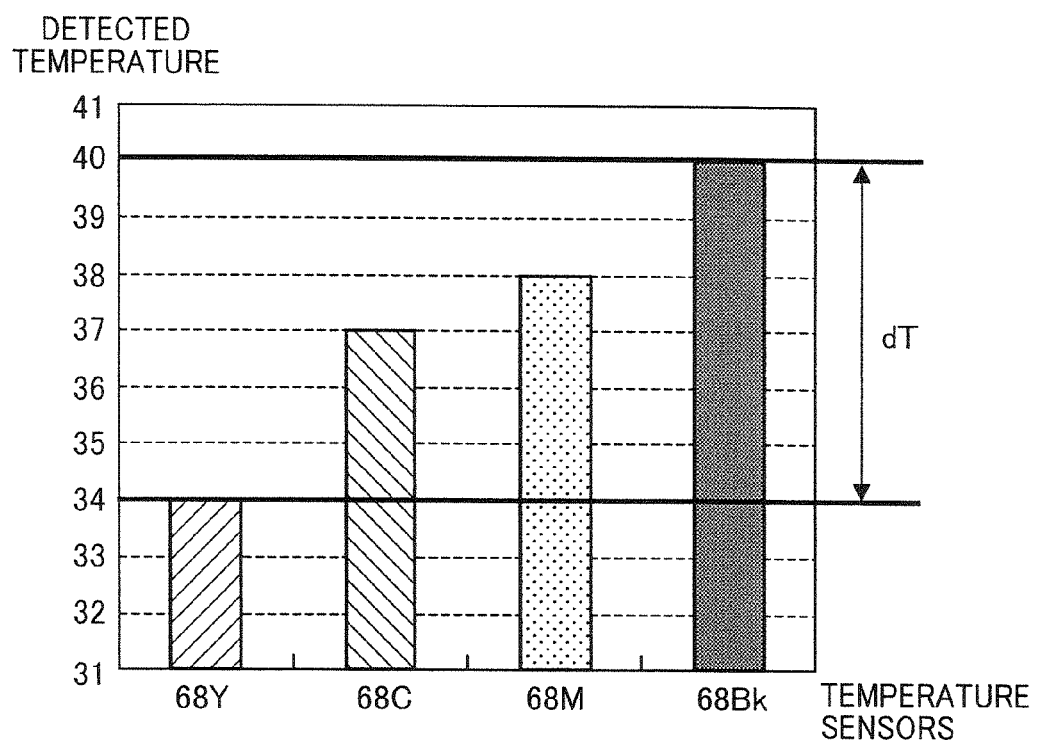
FIG. 7 is a graph showing an example of temperatures detected by respective temperature detectors.

A temperature control operation of the optical scanning devices 24 of the respective colors of yellow Y, cyan C, magenta M and black Bk is described below using FIGS. 4 to 7. FIG. 4 is a flow chart showing an execution control operation of an image forming job. FIG. 5 is a flow chart showing the operation of a process of receiving an execution request of the image forming job. FIG. 6 is a flow chart showing the operation of a temperature control for the respective optical scanning devices 24 of the respective colors of yellow Y, cyan C, magenta M and black Bk during single-color image formation. FIG. 7 is a graph showing an example of temperatures near the fθ lenses 65 of the optical scanning devices 24 of the respective colors of yellow Y, cyan C, magenta M and black Bk detected by the respective temperature detectors 68Y, 68C, 68M and 68Bk.

As shown in FIG. 4, the control unit 80 first executes a job receiving process (S1) in parallel to processings in Step S2 and subsequent Steps to be described later.

As shown in FIG. 5, when an execution request of an image forming job is received by the job receiver 84 (S21; YES) after the start of the job receiving process, the control unit 80 determines whether or not any color image is included in a set of formation-target images included in the image forming job based on information indicating image forming conditions included in the image forming job, the execution request of which has been received (S22).

The control unit 80 saves the execution request of the image forming job as a color job execution request in the RAM (S23) if any color image is determined be included in the set of formation-target images included in the image forming job in Step S22 (S22; YES). On the other hand, the control unit 80 saves the execution request of the image forming job as a monochrome job execution request in the RAM (S24) if no color image is determined be included in the set of formation-target images included in the image forming job in Step S22 (S22; YES).

The control unit 80 returns to Step S21 to repeat the process after the execution of Steps S23 and S24. In this way, execution requests of image forming jobs received by the job receiver 84 are successively stored in the RAM after each execution request is discriminated to be that of a color job or that of a monochrome job.

Referring back to FIG. 4, the control unit 80 (job executor) successively reads the execution requests of the image forming jobs stored in the RAM by the job receiving process (FIG. 5) and executes the image forming job corresponding to the read execution request (S2). To execute an image forming job means that the control unit 80 causes the image forming station 20 to form (transfer to a sheet) a formation-target image indicated by image data included in the image forming job based on information indicating image forming conditions included in the image forming job. If the image forming job executed in Step S2 is a color job (S3; YES), the control unit 80 counts up the number of executions of the color jobs stored in the RAM by 1 (S4). On the other hand, if the image forming job executed in Step S2 is not a color job (S3; NO), the control unit 80 counts up the number of executions of the monochrome jobs stored in the RAM by 1 (S10). Note that the numbers of executions of color jobs and monochrome jobs are stored in the RAM with an initial value set at 0.

After the execution of Step S4 or S10, the control unit 80 successively starts forming images, which are included in the image forming job to be executed and have not been formed yet (S5). Then, the image discriminator 85 discriminates whether or not a current formation-target image is a monochrome image based on the information indicating the image forming conditions included in the image forming job to be executed (S6).

If a current formation-target image is discriminated to be a monochrome image by the image discriminator 85 in Step S6 (S6; YES), the control unit 80 counts up the number of the formed monochrome images stored in the RAM by 1 (S7) and causes the monochrome image to be formed using one optical scanning device 24 (S8). Note that the number of the formed monochrome images is stored in the RAM in advance with an initial value set at 0.

On the other hand, if a current formation-target image is discriminated not to be a monochrome image by the image discriminator 85 in Step S6 (S6; NO), the control unit 80 counts up the number of the formed color images stored in the RAM by 1 (S11) and causes the formation-target color image to be formed using a plurality of optical scanning devices 24 (S12). Note that the number of the formed color images is stored in the RAM in advance with an initial value set at 0.

If there is any unformed image out of formation-target images included in the image forming job to be executed after the execution of Step S8 or S12 (S9; NO), a return is made to Step S5 and the control unit 80 successively starts forming formation-target images which are included in the image forming job to be executed and have not been formed yet.

On the other hand, if the formation of all the formation-target images included in the image forming job to be executed is finished after the execution of Step S8 or S12 (S9; YES), a return is made to Step S2 and the control unit 80 successively reads and executes the execution requests of the image forming jobs which are stored in the RAM by the job receiving process and have not been executed yet.

Further, the temperatures of the respective optical scanning devices 24 are also controlled when the monochrome image is formed in Step S8. Specifically, when the formation of the monochrome image using one optical scanning device 24 is started by the control unit 80 in Step S8, the drive of the polygon motor 66 of the one optical scanning device 24 is started as shown in FIG. 6 (S31). Thereafter, laser light output at a predetermined timing by the drive control of the laser emitter 61 by the control unit 80 is reflected (deflected) toward the surface of the photoconductive drum 22 by the polygon mirror 64 which has been started to be driven.

When the drive of the polygon motor 66 of the one optical scanning device 24 used for image formation is started (S31), the temperature adjuster 88 causes the respective temperature sensors 68Y, 68C, 68M and 68Bk to detect temperatures near the fθ lenses 65 of the optical scanning devices 24 of the respective colors of yellow Y, cyan C, magenta M and black Bk (S32).

In a specific example described below, it is assumed that image formation using the optical scanning device 24 of black Bk is started in Step S8 and the temperatures near the fθ lenses 65 of the optical scanning devices 24 of the respective colors of yellow Y, cyan C, magenta M and black Bk detected by the respective temperature sensors 68Y, 68C, 68M and 68Bk are respectively 34° C., 37° C., 38° C. and 40° C., for example, as shown in FIG. 7.

After the execution of Step S32, the first condition judger 86 calculates temperature differences between the temperature detected by the temperature sensor 68Bk of the optical scanning device 24 of black Bk used for image formation and the temperatures detected by the temperature sensors 68Y, 68C and 68M of the optical scanning devices 24 of yellow M, cyan C and magenta M. Further, the first condition judger 86 judges whether or not the largest temperature difference out of the temperature differences, i.e. a temperature difference dT (6° C.) between the temperature detected by the optical scanning device 24 of black Bk (40° C.) and the temperature detected by the optical scanning device 24 of yellow Y (34° C.) satisfies the first condition of being larger than the predetermined temperature difference (S33).

Here, the predetermined temperature difference is, for example, set at 5° C. In this case, the largest temperature difference dT (6° C.) out of the temperature differences between the temperature detected by the temperature sensor 68Bk of the optical scanning device 24 of black Bk used for image formation and the temperatures detected by the temperature sensors 68Y, 68C and 68M of the optical scanning devices 24 of yellow Y, cyan C and magenta M is larger than the predetermined temperature difference (5° C.) Thus, the first condition judger 86 judges that the first condition is satisfied (S33; YES).

If the first condition is judged to be satisfied by the first condition judger 86 (S33; YES), the second condition judger 87 calculates a color image ratio which is a ratio of the number of the formed color images to the sum of the number of the formed color images stored in the RAM in Step S11 (FIG. 4) and the number of the formed monochrome images stored in the RAM in Step S7 (FIG. 4). Further, the second condition judger 87 judges whether or not the color image ratio is larger than a predetermined ratio (S34). That is, the second condition judger 87 judges whether or not a ratio of the number of the formation-target images discriminated to be color images by the image discriminator 85 to the number of all the formation-target images discriminated by the image discriminator 85 is higher than the predetermined ratio.

Here, the predetermined ratio is assumed to be 50%. It is further assumed that the number of the formed color images stored in the RAM in Step S11 is 6 and the number of the formed monochrome images stored in the RAM in Step S7 is 4. In this case, the color image ratio is 60% (6/(6+4)). Thus, the second condition judger 87 judges that the color image ratio is higher than the predetermined ratio.

The second condition judger 87 judges that the second condition indicating a high possibility that a next formation-target image is a color image is satisfied if the color image ratio is judged to be higher than the predetermined ratio in Step S34 (S34; YES). That is, there is a high possibility that a next formation-target image is a color image if the second condition is judged to be satisfied by the second condition judger 87. On the other hand, there is a high possibility that a next formation-target image is a monochrome image if the second condition is judged not to be satisfied by the second condition judger 87.

On the other hand, the second condition judger 87 judges whether or not any color image is included in a set of images which are included in the image forming job being executed and have not been formed yet includes (S35) if judging that the color image ratio is not larger than the predetermined ratio in Step S34 (S34; NO). The second condition judger 87 also judges that the above second condition is satisfied if any color image is included in the set of the images which are included in the image forming job being executed and have not been formed yet (S35; YES).

On the other hand, the second condition judger 87 judges whether or not any color job execution request is included in a set of execution requests of image forming jobs which are stored in the RAM and have not been executed yet (S36) if no color image is included in the set of the images which are included in the image forming job being executed and have not been formed yet in Step S35 (S35; NO). The second condition judger 87 also judges that the above second condition is satisfied if any color job execution request is included in the set of the execution requests of the image forming jobs which are stored in the RAM and have not been executed yet (S36; YES).

If the second condition is judged to be satisfied by the second condition judger 87 (S34; YES or S35; YES or S36; YES), the temperature adjuster 88 drives not only the polygon motor 66Bk of the optical scanning device 24 of black Bk, which has been started to be driven in Step 31, but also the polygon motors 66Y, 66C, 66M of the optical scanning devices 24 of yellow Y, cyan C and magenta M (S37).

Thereafter, the temperature adjuster 88 causes the respective temperature sensors 68Y, 68C, 68M and 68Bk to detect the temperatures near the fθ lenses 65 of the optical scanning devices 24 of the respective colors of yellow Y, cyan C, magenta M and black Bk again (S38). Subsequently, the temperature adjuster calculates each of the temperature differences between the temperature detected by the temperature sensor 68Bk of the optical scanning device 24 of black Bk and the temperatures detected by the temperature sensors 68Y, 68C and 68M. When the largest temperature difference out of these temperature differences falls below the second temperature difference (e.g. 3° C.) smaller than the predetermined temperature difference (5° C.) (S39; YES), the temperature adjuster 88 stops the drive of the polygon motors 66Y, 66C and 66M of the optical scanning devices 24 of yellow Y, cyan C and magenta M driven in Step S37 (S40).

On the other hand, if the largest temperature difference out of the temperature differences between the temperature detected by the temperature sensor 68Bk of the optical scanning device 24 of black Bk used for image formation and the temperatures detected by the temperature sensors 68Y, 68C and 68M of the optical scanning devices 24 of yellow Y, cyan C and magenta M but black Bk is not smaller than the second temperature difference (3° C.) in Step S39 (S39; NO), the temperature adjuster 88 continues the drive of the polygon motors 66Bk, 66Y, 66C and 66M.

If the first condition is judged not to be satisfied by the first condition judger 86 (S33; NO), if the second condition is judged not to be satisfied by the second condition judger 87 (S34; NO and S35; NO and S36; NO) or if the largest temperature difference is not smaller than the second temperature difference (3° C.) in Step S39 (S39; NO) and if the image formation of the monochrome image started in Step S8 has not been finished yet (S41; NO), a return is made to Step S32 to repeat the process. On the other hand, if the image formation of the monochrome image started in Step S8 is finished (S41; YES), the temperature control for the optical scanning devices 24 of the respective colors of yellow Y, cyan C, magenta M and black Bk is finished in accordance with this.

According to the above embodiment, if the first condition is satisfied (S33; YES) and the second condition is satisfied (S34; YES or S35; YES or S36; YES), i.e. temperature differences among the plurality of optical scanning devices 24 are large and there is a high possibility of forming a color image next when a monochrome image is formed (S8), the temperature adjuster 88 increases also the temperatures of the optical scanning devices 24 not used for image formation by driving the polygon motors 66Bk, 66Y, 66C and 66M of all the optical scanning devices 24 (S37). Thus, a possibility that temperature differences among the optical scanning devices 24 are large when an image is formed next using a plurality of optical scanning devices 24 can be reduced. This can reduce a possibility of scan position shifts due to temperature differences among the optical scanning devices 24.

On the other hand, if the first condition is satisfied (S33; YES), but the second condition is not satisfied (S34; NO or S35; NO or S36; NO), i.e. temperature differences among the plurality of optical scanning devices 24 are large, but a possibility of forming a color image next is not high when a monochrome image is formed (S8), a possibility of scan position shifts caused when a plurality of optical scanning devices 24 are used is also not high. At this time, the temperature adjuster 88 does not drive the polygon motors 66Y, 66C and 66M of all the optical scanning devices 24 but the optical scanning device 24 used for image formation, wherefore unnecessary power consumption can be avoided.

Further, the second condition judger 87 can appropriately judge whether or not the second condition indicating a high possibility of forming a color image next is satisfied based on whether or not the ratio of the number of formation-target images discriminated to be color images to the number of all formation-target images discriminated by the image discriminator 85 is larger than the predetermined ratio (S34), i.e. based on a history discriminated by the image discriminator 85.

If any color image is included in a set of formation-target images which are included in an image forming job being executed and have not been formed yet (S35; YES), there is a high possibility of forming a color image next. That is, the second condition judger 87 can appropriately judge whether or not the second condition indicating a high possibility of forming a color image next is satisfied based on whether or not any color image is included in the set of the formation-target images which are included in the image forming job being executed and have not been formed yet (S35).

If any color job execution request is included in a set of execution requests of image forming jobs which have not been executed yet (S36; YES), there is a high possibility of executing that color job next. Thus, there is a high possibility of forming a color image included in that color job. That is, the second condition judger 87 judges whether or not there is a high possibility of executing a color job next based on whether or not any color job execution request is included in a set of execution requests of image forming jobs which have not been executed yet (S36) and can appropriately judge whether or not the second condition indicating a high possibility of forming a color image next is satisfied based on this judgment result.

Further, during the execution of the total motor drive process for driving the polygon motors 66Bk, 66Y, 66C and 66M of all the optical scanning devices 24 by the temperature adjuster 88 (S37), the temperature differences among the respective optical scanning devices 24 might become smaller than the second temperature difference (S39; YES). In this case, if the drive of the polygon motors 66Bk, 66Y, 66C and 66M of all the optical scanning devices 24 is continued also thereafter, the temperatures of all the optical scanning devices 24 but the optical scanning device 24 used for image formation increase more than necessary and the temperature differences among the optical scanning devices 24 may be reduced more than necessary. However, according to the above embodiment, if the temperature differences among the respective optical scanning devices 24 become smaller than the second temperature difference (S39; YES) during the execution of the total motor drive process (S37), the temperature adjuster 88 stops the motors of all the optical scanning devices but the optical scanning device 24 used for image formation (S40). Thus, it can be avoided that temperature differences among the optical scanning devices 24 become smaller than necessary.

Note that, in the above embodiment, the temperature sensor 68 is disposed outside the laser light path and within the predetermined short distance from the fθ lens 65. However, the disposed position of the temperature sensor 68 is not limited to that in the above embodiment.

For example, the temperature sensor 68 may be disposed in contact with an end part of the fθ lens 65 and, thereby, may detect the temperature of the fθ lens 65 itself. Alternatively, the temperature sensor 68 may be arranged at a position as close to the fθ lens 65 as possible in the housing of the optical scanning device 24 if there is no space to dispose the temperature sensor 68 near the fθ lens 65.

The closer to the fθ lens 65 the temperature sensor 68 is arranged, the more accurately the temperature of the fθ lens 65 can be detected. This enables differences in the refractive index of the fθ lens 65 among the respective optical scanning devices 24 to be accurately reduced by accurately reducing differences in the temperature near the fθ lens 65 among the respective optical scanning devices 24 by the above temperature control.

Further, in the above embodiment, the color printer 1 has been described as an example of the image forming apparatus according to the present disclosure. The present disclosure can also be applied to copiers, facsimile machines and complex machines with various functions which are capable of color printing. Further, although the tandem color printer has been described as an example in the above embodiment, another printing method may be adopted if the image forming apparatus is of a type including a plurality of optical scanning devices for scanning a photoconductor with laser light.

Further, the present disclosure can be modified in various manners without being limited to the configuration of the above embodiment. The configuration and process shown in FIGS. 1 to 7 are merely illustration of the embodiment according to the present disclosure and not of the nature to limit the present disclosure to the above embodiment.

For example, the second condition judger 87 may judge whether or not a ratio of the number of executed color jobs to the sum of the number of executed color jobs stored in the RAM in Step S4 (FIG. 4) and the number of executed monochrome jobs stored in the RAM in Step S10 (FIG. 4) is higher than a predetermined ratio instead of judging whether or not the color image ratio is higher than the predetermined ratio in Step S34 (FIG. 6). That is, the second condition judger 87 may judge whether or not the second condition indicating a high possibility of forming a color image next based on whether or not a ratio of color jobs to a plurality of executed image forming jobs is higher than the predetermined ratio.

In this case, the second condition judger 87 can appropriately judge whether or not there is a high possibility of executing a color job next based on whether or not a ratio of color jobs to the plurality of executed image forming jobs is higher than the predetermined ratio, i.e. based on an execution history of the image forming jobs. If the ratio of color jobs to the plurality of executed image forming jobs is higher than the predetermined ratio, there is a high possibility of executing a color job next. Thus, there is also a high possibility of forming a color image included in the color job. That is, the second condition judger 87 judges whether or not there is a high possibility of executing a color job next based on whether or not the ratio of color jobs to the plurality of executed image forming jobs is higher than the predetermined ratio and can appropriately judge whether or not the second condition indicating a high possibility of forming a color image next is satisfied based on this judgment result.

A modification simplified by executing any one or any two of Steps S34, S35 and S36 (FIG. 6) may be adopted. That is, a simplification may be made by reducing the number of processings used for the second condition judger 87 to judge whether or not the second condition is satisfied.

According to the present disclosure as described above, it is possible to provide an image forming apparatus capable of suppressing scan position shifts occurring due to temperature differences among respective optical scanning devices without unnecessarily consuming power.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus including a plurality of optical scanning devices arranged in correspondence with a plurality of photoconductors, configured to scan the corresponding photoconductors with laser light, comprising:
    an optical scanning device including
        a light source for emitting laser light,
        a rotational polygon mirror for reflecting the laser light output from the light source and scanning the photoconductor,
        a motor for rotating the rotational polygon mirror, and
        a temperature detector for detecting temperature of the optical scanning device;
    a job receiver for receiving an execution request of an image forming job;

a job executor for executing the image forming job, the execution request of which has been received by the job receiver;

an image discriminator for discriminating whether each formation-target image included in the image forming job being executed is a single-color image to be formed using only one of the plurality of optical scanning devices or a multi-color image to be formed using a plurality of ones of the optical scanning devices;

a first condition judger for judging whether or not a largest temperature difference out of temperature differences between temperature detected by the temperature detector of the one optical scanning device and temperatures detected by all the temperature detectors but the temperature detector of the one optical scanning device satisfies a first condition of being larger than a predetermined temperature difference;

a second condition judger for judging whether or not a second condition indicating a high possibility that a next formation-target image is the multi-color image is satisfied; and a temperature adjuster for performing a total motor drive process for driving the motors of all the optical scanning devices if the first condition is judged to be satisfied by the first condition judger and the second condition is judged to be satisfied by the second condition judger when a current formation-target image is discriminated to be the single-color image by the image discriminator and driving the motor of the one optical scanning device and not driving the motors of all the optical scanning devices but the one optical scanning device if the first condition is judged to be satisfied by the first condition judger and the second condition is judged not to be satisfied by the second condition judger when a current formation-target image is discriminated to be the single-color image by the image discriminator.

2. The image forming apparatus according to claim 1, wherein:
the second condition judger judges that the second condition is satisfied if a ratio of the number of formation-target images discriminated to be the multi-color images by the image discriminator to the number of all formation-target images discriminated by the image discriminator is higher than a predetermined ratio.

3. The image forming apparatus according to claim 1, wherein:
the second condition judger judges that the second condition indicating a high possibility that a next formation-target image is the multi-color image is satisfied if a ratio of color jobs which are the image forming jobs including the multi-color image as a formation-target image to a plurality of executed image forming jobs is higher than a predetermined ratio.

4. The image forming apparatus according to claim 1, wherein:
the second condition judger judges that the second condition is satisfied if the multi-color image is included in a set of formation-target images which are included in the image forming job being executed and have not been formed yet.

5. The image forming apparatus according to claim 1, wherein:
the second condition judger judges that the second condition is satisfied if an execution request of a color job which is the image forming job including the multi-color image as a formation-target image is included in a set of execution requests of the image forming jobs which have not been executed yet after being received by the job receiver.

6. The image forming apparatus according to claim 1, wherein
the temperature adjuster stops the motors of all the optical scanning devices but the one optical scanning device when the largest temperature difference out of the temperature differences between the temperature detected by the temperature detector of the one optical scanning device and the temperatures detected by the temperature detectors of all the optical scanning devices but the one optical scanning device becomes smaller than a second temperature difference smaller than the predetermined temperature difference during the execution of the total motor drive process.

7. The image forming apparatus according to claim 1, wherein:
the optical scanning device includes an optical lens made of resin and configured to focus the laser light on a surface of the photoconductor; and
the temperature detector detects the temperature of the optical lens or temperature near the optical lens.

8. The image forming apparatus according to claim 7, wherein:
the optical lens is an f$\theta$ lens.

* * * * *